United States Patent
Park et al.

(10) Patent No.: US 11,562,046 B2
(45) Date of Patent: Jan. 24, 2023

(54) NEURAL NETWORK PROCESSOR USING DYADIC WEIGHT MATRIX AND OPERATION METHOD THEREOF

(71) Applicant: SAMSUNG ELECTRONICS CO., LTD., Suwon-si (KR)

(72) Inventors: Junseok Park, Suwon-si (KR); Inyup Kang, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 603 days.

(21) Appl. No.: 16/675,709

(22) Filed: Nov. 6, 2019

(65) Prior Publication Data

US 2020/0167637 A1 May 28, 2020

(30) Foreign Application Priority Data

Nov. 26, 2018 (KR) .................. 10-2018-0147693
Jul. 17, 2019 (KR) .................. 10-2019-0086634

(51) Int. Cl.
| G06F 17/00 | (2019.01) |
| G06F 17/16 | (2006.01) |
| G06N 3/063 | (2006.01) |
| G06F 7/44  | (2006.01) |
| G06N 3/08  | (2006.01) |

(52) U.S. Cl.
CPC .............. *G06F 17/16* (2013.01); *G06F 7/44* (2013.01); *G06N 3/063* (2013.01); *G06N 3/08* (2013.01)

(58) Field of Classification Search
CPC .... G06F 17/16; G06F 7/44; G06F 2207/4824; G06N 3/06; G06N 3/08; G06N 3/0454
See application file for complete search history.

(56) References Cited

U.S. PATENT DOCUMENTS

| 5,995,954 A  | 11/1999 | Loos             |
| 6,701,029 B1 | 3/2004  | Berfanger et al. |
| 6,950,755 B2 | 9/2005  | Stahl            |

(Continued)

FOREIGN PATENT DOCUMENTS

| CN | 110297479 A   | * | 10/2019 | ......... G05B 23/0262 |
| DE | 102016113310 A1 | * | 1/2018 | |

(Continued)

OTHER PUBLICATIONS

A. Usakova et al., "Using of Discrete Orthogonal Transforms for Convolution", Journal of Electrical Engineering, 2002, vol. 53, No. 9-10, 285-288.

(Continued)

*Primary Examiner* — Naum Levin
(74) *Attorney, Agent, or Firm* — Lee IP Law, P.C.

(57) ABSTRACT

An neural network (NN) processor includes an input feature map buffer configured to store an input feature matrix, a weight buffer configured to store a weight matrix trained in a form of a, a transform circuit configured to perform a Walsh-Hadamard transform on an input feature vector obtained from the input feature matrix and a weight vector included in the weight matrix to output a transformed input feature vector and a transformed weight vector, and an arithmetic circuit configured to perform an element-wise multiplication (EWM) on the transformed input feature vector and the transformed weight vector.

20 Claims, 15 Drawing Sheets

(56) References Cited

U.S. PATENT DOCUMENTS

| | | | |
|---|---|---|---|
| 7,383,235 B1 | 6/2008 | Ulyanov et al. | |
| 8,086,052 B2 | 12/2011 | Toth et al. | |
| 9,647,809 B2 | 5/2017 | Keusgen et al. | |
| 9,702,759 B2 | 7/2017 | Schweid | |
| 10,860,921 B2 * | 12/2020 | Elsen | G06N 3/063 |
| 11,062,450 B2 * | 7/2021 | Cranmer | A61B 5/369 |
| 11,397,889 B2 * | 7/2022 | Jaganathan | G16B 40/20 |
| 2006/0233250 A1 | 10/2006 | Cha et al. | |
| 2010/0169158 A1 * | 7/2010 | Agarwal | G06N 20/00 705/7.11 |
| 2018/0089587 A1 | 3/2018 | Suresh et al. | |
| 2018/0114145 A1 | 4/2018 | Holtmann-Rice et al. | |

FOREIGN PATENT DOCUMENTS

| | | | |
|---|---|---|---|
| JP | 6778670 B2 * | 11/2020 | |
| KR | 202000062014 A * | 6/2020 | |
| WO | WO-2020062312 A1 * | 4/2020 | |
| WO | WO-2020159800 A1 * | 8/2020 | G06F 15/7821 |

OTHER PUBLICATIONS

Y. Cheng et al., "An Exploration of Parameter Redundancy in Deep Networks with Circulant Projections", ICCV, 2015.

A. Lavin et al., "Fast Algorithms for Convolutional Neural Networks", CVPR, 2016.

C. Ding et al., "CirCNN: Accelerating and Compression Deep Neural Networks Using Block-Circulant Weight Matrices", MICRO-50, 2017.

A. Thomas et al., "Learning Compressed Transforms with Low Displacement Rank", 2018.

S. Wang et al., "C-LSTM: Enabling Efficient LSTM using Structured Compression Techniques on FPGAs", FPGA, 2018.

Yue, et al. "A 65nm 0.39-140.3TOPS/W 1-12bit Unified Neural Network Processor using Block-Circulant Enabled Transpose-Domain Acceleration with 8.1x Higher TOPS/mm2 and 6T HBST-TRAM based 2D Data Reuse Architecture", submitted for ISSCC 2019.

L. Zhao et al., "Theoretical Properties for Neural Networks with Weight Matrices of Low Displacement Rank", ICML, 2017.

* cited by examiner

FIG. 3

| y | | w | | | | | | | | | x |
|---|---|---|---|---|---|---|---|---|---|---|---|
| y0 | | h0 | h1 | h2 | h3 | h4 | h5 | h6 | h7 | | x0 |
| y1 | | h7 | h0 | h1 | h2 | h3 | h4 | h5 | h6 | | x1 |
| y2 | | h6 | h7 | h0 | h1 | h2 | h3 | h4 | h5 | | x2 |
| y3 | = | h5 | h6 | h7 | h0 | h1 | h2 | h3 | h4 | × | x3 |
| y4 | | h4 | h5 | h6 | h7 | h0 | h1 | h2 | h3 | | x4 |
| y5 | | h3 | h4 | h5 | h6 | h7 | h0 | h1 | h2 | | x5 |
| y6 | | h2 | h3 | h4 | h5 | h6 | h7 | h0 | h1 | | x6 |
| y7 | | h1 | h2 | h3 | h4 | h5 | h6 | h7 | h0 | | x7 |

FIG. 4

| y | | w | | | | | | | | | x |
|---|---|---|---|---|---|---|---|---|---|---|---|
| y0 | | h0 | h1 | h2 | h3 | h4 | h5 | h6 | h7 | | x0 |
| y1 | | h1 | h0 | h3 | h2 | h5 | h4 | h7 | h6 | | x1 |
| y2 | | h2 | h3 | h0 | h1 | h6 | h7 | h4 | h5 | | x2 |
| y3 | = | h3 | h2 | h1 | h0 | h7 | h6 | h5 | h4 | × | x3 |
| y4 | | h4 | h5 | h6 | h7 | h0 | h1 | h2 | h3 | | x4 |
| y5 | | h5 | h4 | h7 | h6 | h1 | h0 | h3 | h2 | | x5 |
| y6 | | h6 | h7 | h4 | h5 | h2 | h3 | h0 | h1 | | x6 |
| y7 | | h7 | h6 | h5 | h4 | h3 | h2 | h1 | h0 | | x7 |

FIG. 10

$$\text{OFM\_Mat} \quad\quad \text{W\_Mat} \quad\quad \text{IFM\_Mat}$$

$$\begin{bmatrix} a_1 \\ \vdots \\ \overline{a_i} \\ \vdots \\ a_p \end{bmatrix} = \begin{bmatrix} W_{11} & \cdots & W_{1q} \\ \vdots & & \vdots \\ \vdots & W_{ij} & \vdots \\ \vdots & & \vdots \\ W_{p1} & \cdots & W_{pq} \end{bmatrix} \begin{bmatrix} \overline{x_1} \\ \vdots \\ \overline{x_j} \\ \vdots \\ \overline{x_q} \end{bmatrix}$$

FIG. 11

| W11 | | | | W_Mat | W12 | | |
|---|---|---|---|---|---|---|---|
| h0 | h1 | h2 | h3 | h4 | h5 | h6 | h7 |
| h1 | h0 | h3 | h2 | h5 | h4 | h7 | h6 |
| h2 | h3 | h0 | h1 | h6 | h7 | h4 | h5 |
| h3 | h2 | h1 | h0 | h7 | h6 | h5 | h4 |
| h4 | h5 | h6 | h7 | h0 | h1 | h2 | h3 |
| h5 | h4 | h7 | h6 | h1 | h0 | h3 | h2 |
| h6 | h7 | h4 | h5 | h2 | h3 | h0 | h1 |
| h7 | h6 | h5 | h4 | h3 | h2 | h1 | h0 |
| W21 | | | | | W22 | | |

FIG. 14B
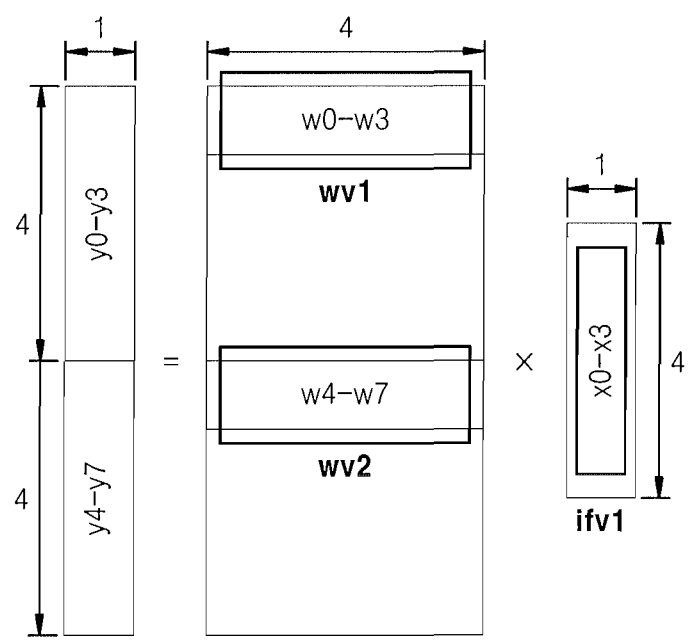
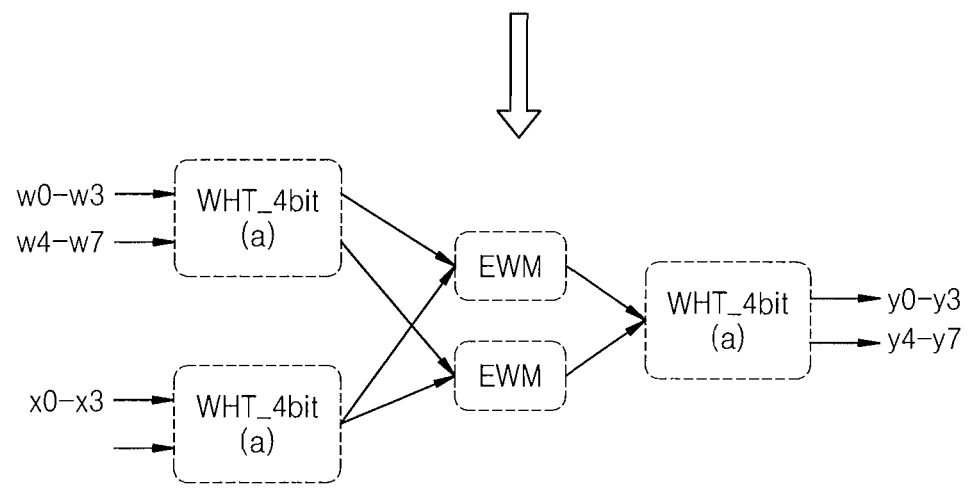

NEURAL NETWORK PROCESSOR USING DYADIC WEIGHT MATRIX AND OPERATION METHOD THEREOF

CROSS-REFERENCE TO RELATED APPLICATIONS

Korean Patent Application No. 10-2018-0147693, filed on Nov. 26, 2018, and Korean Patent Application No. 10-2019-0086634, filed on Jul. 17, 2019, in the Korean Intellectual Property Office, and entitled: "Apparatus for Accelerating Neural Network Using Weight in Dyadic Matrix and Operation Method Thereof," are incorporated by reference herein in their entirety.

BACKGROUND

1. Field

Embodiments relate to a neural network (NN) processor and an operation method of the apparatus, and more particularly, to a NN processor using weight in a form of a dyadic matrix and an operation method of the apparatus.

2. Description of the Related Art

A NN refers to a computational architecture. Recently, as neural network technology has been developed, research on analyzing input data and extracting valid information by using a neural network device using one or more neural network models in various kinds of electronic systems has been actively performed.

Some research on neural network devices concentrate on increasing the energy efficiency so as not to reduce the performance or just slightly reduce the performance of a neural network. Therefore, regarding neural network devices, a technology capable of reducing the computational complexity and increasing an operation speed while preventing the reduction of the performance and accuracy of the neural network or allowing only a slight reduction of the performance or accuracy of the neural network is required.

SUMMARY

According to an aspect, a neural network (NN) processor for a NN may include an input feature map buffer configured to store an input feature matrix, a weight buffer configured to store a weight matrix trained in a form of a dyadic matrix, a transform circuit configured to perform a Walsh-Hadamard transform on an input feature vector obtained from the input feature matrix and a weight vector included in the weight matrix and to output a transformed input feature vector and a transformed weight vector, and an arithmetic circuit configured to perform an element-wise multiplication (EWM) on the transformed input feature vector and the transformed weight vector.

According to an aspect, a method of operating a neural network (NN), may include obtaining a weight matrix in a form of a dyadic matrix by training the NN under a dyadic constraint for forming the weight matrix in the dyadic matrix, and generating an output feature map based on the weight matrix and an input feature map.

According to an aspect, a method of operating a neural network (NN) may include performing a Walsh-Hadamard transform on a weight vector and an input feature vector to generate a transformed weight vector and a transformed input feature vector, performing an element-wise multiplication (EWM) on the transformed weight vector and the transformed input feature vector to generate a resultant vector, and generating an output feature vector by performing an inverse Walsh-Hadamard transform on the resultant vector.

According to an aspect, a neural network device based on a neural network (NN) may include a component based on at least one intellectual property (IP) block and a neural network processor configured to communicate with the at least component through a system bus and to output an information signal based on input data provided by the component. The neural network processor may be configured to generate an output feature vector by performing a transform using only coefficients of +1, −1, or 0 on a weight vector and an input feature vector included in a weight matrix trained in a form of a dyadic matrix to generate a transformed weight vector and a transformed input feature vector, and to perform an element-wise multiplication (EWM) on the transformed weight matrix and the transformed input feature vector.

BRIEF DESCRIPTION OF THE DRAWINGS

Features will become apparent to those of skill in the art by describing in detail exemplary embodiments with reference to the attached drawings in which:

FIG. 3 illustrates an expression of a neural network processor based on weight in a block-circulant matrix;

FIG. 4 illustrates an expression of a neural network processor according to an example embodiment;

FIG. 10 illustrates expressions of a weight matrix and an input feature matrix according to an example embodiment;

FIG. 11 illustrates a weight matrix according to an example embodiment;

FIGS. 14A and 14B illustrate an operation method of a neural network processor according to an example embodiment;

DETAILED DESCRIPTION

Hereinafter, embodiments will be described in detail with reference to the accompanying drawings.

Figure 1:
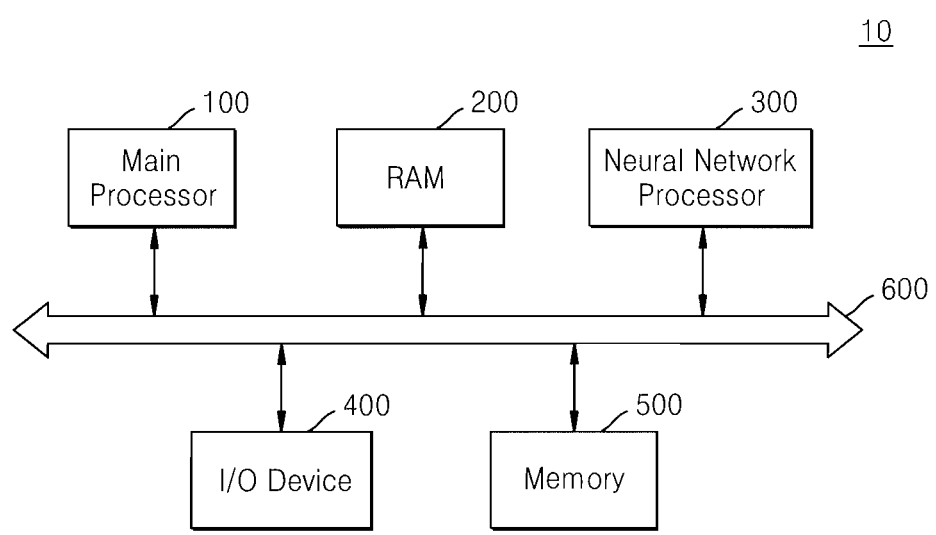
FIG. 1 illustrates a data processing system according to an example embodiment.

FIG. 1 illustrates a data processing system 10 according to an example embodiment. The data processing system 10 extracts valid information by analyzing input data in real time based on a neural network (NN) and may determine a situation or control elements of an electronic device in which the data processing system 10 is mounted based on the extracted information. For example, the data processing system 10 may be applied to a drone, an advanced drivers assistance system (ADAS), a smart TV, a smartphone, a medical device, a mobile device, an image display device, a measuring device, or an Internet of Things (IoT) device, and the like, and may be mounted in various kinds of electronic devices.

The data processing system 10 may include a component based on at least one intellectual property (IP) block and a neural network processor 300. The data processing system 10 may include components based on various kinds of IP blocks. For example, as illustrated in FIG. 1, the data processing system 10 may include a main processor 100, a random access memory (RAM) 200, an input and output (I/O) device 400, and memory 500. Other than the above elements, the data processing system 10 may further include other universal elements, e.g., a multi-format codec (MFC), a video module (for example, a camera interface, a joint photographic experts group (JPEG) processor, a video processor, or a mixer), a three-dimensional (3D) graphic core, an audio system, a display driver, a graphic processing unit (GPU), a digital signal processor (DSP), and the like.

The elements of the data processing system 10, e.g., the main processor 100, the RAM 200, the neural network processor 300, the I/O device 400, and the memory 500 may transmit and receive data through a system bus 600. For example, an advanced microcontroller bus architecture (AMBA) protocol of advanced reduced instruction set computer (RISC) machine (ARM) as a bus standard may be applied to the system bus 600, although various kinds of protocols may be applied.

In an embodiment, the elements of the data processing system 10, i.e., the main processor 100, the RAM 200, the neural network processor 300, the I/O device 400, and the memory 500 may be implemented by one semiconductor chip. For example, the data processing system 10 may be implemented by a system on chip (SoC). In other implementations, the data processing system 10 may be implemented by a plurality of semiconductor chips or by an application processor mounted in the device.

The main processor 100 may control an entire operation of the data processing system 10. For example, the main processor 100 may be a central processing unit (CPU). The main processor 100 may include a single core or a plurality of cores. The main processor 100 may process or execute programs and/or data stored in the RAM 200 and the memory 500. For example, the main processor 100 may control various functions of the data processing system 10 by executing the programs stored in the memory 500.

The RAM 200 may temporarily store programs, data, instructions, and the like. For example, the programs and/or data stored in the memory 500 may be temporarily loaded on the RAM 200 in accordance with a control or booting code of the main processor 100. The RAM 200 may be implemented by dynamic RAM (DRAM), static RAM (SRAM), and the like.

The I/O device 400 receives input data from a user or from the outside and may output a data processing result of the data processing system 10. The I/O device 400 may be implemented by using at least one of a touch screen panel, a keyboard, a mouse, various kinds of sensors, and the like.

In an embodiment, the I/O device 400 may collect information around the data processing system 10. For example, the I/O device 400 may include at least one of various kinds of sensing devices, e.g., as an imaging device, image sensor, a light detection and ranging (LIDAR) sensor, an ultrasonic sensor, an infrared (IR) sensor, and the like, or may receive a sensing signal from any of these devices. In an embodiment, the I/O device 400 may sense or receive an image signal from the outside of the data processing system 10 and may transform the sensed or received image signal into image data, that is, an image frame. The I/O device 400 stores the image frame in the memory 500 or may provide the image frame to the neural network processor 300.

The memory 500 as a storage unit for storing data may store, for example, an operating system (OS), various programs, and various data items. The memory 500 may be the DRAM. The memory 500 may include at least one of volatile memory and non-volatile memory. The non-volatile memory may be read only memory (ROM), programmable ROM (PROM), electrically programmable ROM (EPROM), electrically erasable and programmable ROM (EEPROM), flash memory, phase-change RAM (PRAM), magnetic RAM (MRAM), resistive RAM (RRAM), ferroelectric RAM (FRAM), and the like. The volatile memory may be the DRAM, the SRAM, synchronous DRAM (SDRAM), and the like. In addition, in an embodiment, the memory 150 may be implemented by a storage device, e.g., a hard disk drive (HDD), a solid-state drive (SSD), a compact flash (CF), a secure digital (SD), a micro-secure digital (micro-SD), a mini-secure digital (mini-SD), an extreme digital (xD), a memory stick, and the like.

The neural network processor 300 may generate the NN, may train the NN, may perform an operation based on received input data, may generate an information signal based on an operation result, may retrain the NN, and the like. The NN may be one of various kinds of neural network models, e.g., a convolution neural network (CNN), a region with convolution neural network (R-CNN), a region proposal network (RPN), a recurrent neural network (RNN), a stacking-based deep neural network (S-DNN), a state-space dynamic neural network (S-SDNN), a deconvolution network, a deep belief network (DBN), a restricted Boltzmann machine (RBM), a fully convolutional network, a long short-term memory (LSTM) network, a classification network, and the like. A neural network structure will be exemplarily described with reference to FIG. 2.

Figure 2:
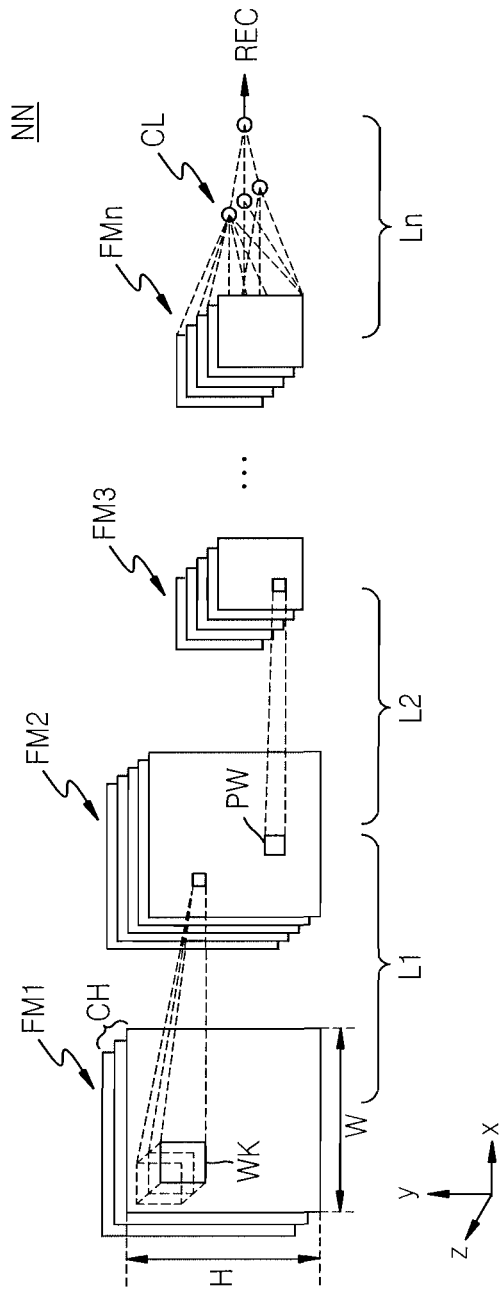
FIG. 2 illustrates a structure of a convolution neural network (CNN) as an example of a neural network structure.

FIG. 2 illustrates a structure of the CNN as an example of the neural network structure. The NN may include a plurality of layers L1 to Ln. The NN may be a DNN or an architecture of an n-layer NN. The plurality of layers L1 to Ln may be implemented by a convolution layer, a pooling layer, an activation layer, and a fully-connected layer. For example, the first layer L1 may be the convolution layer, the second layer L2 may be the pooling layer, and the nth layer Ln as an output layer may be the fully-connected layer. The NN may further include the activation layer and a layer that performs another kind of operation.

Each of the plurality of layers L1 to Ln may generate an output feature map or a recognizing signal REC by receiving input data (e.g., an image frame) or a feature map generated by a previous layer as an input feature map and operating on the input feature map. At this time, the feature map means data in which various characteristics of the input data are represented. Feature maps FM1, FM2, . . . , and FMn may have, e.g., two-dimensional matrix or three-dimensional matrix (or tensor) structures. Each of the feature maps FM1, FM2, . . . , and FMn may include at least one channel CH in which feature values are arranged in rows and columns (in a matrix). When each of the feature maps FM1, FM2, . . . , and FMn includes a plurality of channels CH, the number of rows H may be equal to the number of columns W in the plurality of channels CH. The rows H, the columns W, and the channels CH may respectively correspond to an x-axis, a y-axis, and a z-axis. A feature value arranged in a specific row H and column W in a two-dimensional matrix in directions of x-axis and y-axis (hereinafter, a matrix means the two-dimensional matrix in the directions of the x-axis and y-axis) may be referred to as an element of the matrix. For example, a matrix structure of 4×5 may include 20 elements.

The first layer L1 may generate the second feature map FM2 by convolving the first feature map FM1 with a weight value kernel WK. The weight value kernel WK may be referred to as a filter or a weight value map. The weight value kernel WK may filter the first feature map FM1. A structure of the weight value kernel WK is similar to a structure of the feature map. The weight value kernel WK includes at least one channel CH in which weight values are arranged in rows and columns (in a matrix). The number of channels CH is equal to the number of corresponding feature maps, for example, channels CH of the first feature map FM1. The same channel CH of the weight value kernel WK and the first feature map FM1 may be convoluted.

The weight value kernel WK may be convolved with windows (or tiles) of the first feature map FM1 while shifting the first feature map FM1 by a sliding window method. While shifting the first feature map FM1, each of the weight values included in the weight value kernel WK may be multiplied by and added to all the feature values in a region in which each of the weight values included in the weight value kernel WK overlaps the first feature map FM1. As the first feature map FM1 is convolved with the weight value kernel WK, one channel of the second feature map FM2 may be generated. In FIG. 2, one weight value kernel WK is displayed. However, actually, a plurality of weight value kernels WK are convolved with the first feature map FM1. Accordingly, the second feature map FM2 including a plurality of channels may be generated.

The second layer L2 may generate the third feature map FM3 by changing a spatial size of the second feature map FM2 through pooling, e.g., sampling or down-sampling. A two-dimensional pooling window PW is shifted on the second feature map FM2 in units of a size of the pooling window PW and the maximum value of feature data items (or an average value of the feature data items) in a region that overlaps the pooling window PW may be selected. Therefore, the third feature map FM3 of which spatial size is changed from the second feature map FM2 may be generated. The number of channels of the third feature map FM3 is equal to the number of channels of the second feature map FM2.

The nth layer Ln may classify a class CL of input data by combining features of the nth feature map FMn. In addition, the nth layer Ln may generate the recognizing signal REC corresponding to the class CL. In an embodiment, the input data may correspond to frame data included in a video stream and the nth layer Ln may recognize an object and may generate the recognizing signal REC corresponding to the recognized object by extracting the class CL corresponding to the object included in an image represented by the frame data based on the nth feature map FMn provided by a previous layer.

Referring again to FIG. 1, the neural network processor 300 may be a hardware accelerator for performing an operation in accordance with the neural network models. The neural network processor 300 may be the hardware accelerator, e.g., a neural network processing unit (NPU), a tensor processing unit (TPU), a neural engine, which is an exclusive module for driving the NN, and the like. The neural network processor 300 may be referred to as a neural network processing device or a neural network integrated circuit.

The neural network processor 300 may receive the input data from at least one of other elements, for example, the main processor 100, the I/O device 400, and the memory 500 through the system bus 600 and may generate an information signal based on the input data. For example, the information signal generated by the neural network processor 300 may include at least one of various kinds of recognizing signals such as a voice recognizing signal, an object recognizing signal, an image recognizing signal, a biometrics recognizing signal, and the like. For example, the neural network processor 300 receives the frame data included in the video stream as the input data and may generate a recognizing signal on an object included in an image represented by the frame data from the frame data.

The neural network processor 300 may generate the information signal by performing a neural network operation on the input data and the neural network operation may include a convolution operation. In the NN based on the convolution operation such as the CNN, the convolution operation may occupy a remarkable amount of neural network operation. An operation amount of the convolution operation may be determined by various factors such as the number of channels of the input feature map, the number of channels of the weight value kernel, a size of the input feature map, a size of the weight value kernel, and precision of a value. As described above with reference to FIG. 2, the NN may be implemented by a complicated architecture. Therefore, the neural network processor 300 may perform large amounts of convolution operations.

The neural network processor 300 according to an example embodiment may use a weight matrix in the dyadic matrix in order to efficiently perform an operation. For this purpose, the neural network processor 300 may train the NN so that the weight matrix is in the dyadic matrix. In an embodiment, the neural network processor 300 may generate the weight matrix in the dyadic matrix by training the NN under a constraint for forming the weight matrix in the dyadic matrix. Training the NN so that the weight matrix in a required form is generated may be referred to as training weight. Here, the constraint for forming the weight matrix in the dyadic matrix may be referred to as a dyadic constraint in the current specification.

In an embodiment, the neural network processor 300 may obtain an input feature matrix from the input feature map so that the convolution operation between the weight matrix and the input feature map corresponds to a matrix multiplication operation of the input feature matrix. At this time, the weight matrix may be in the dyadic matrix. The neural network processor 300 may generate an output feature matrix by performing the matrix multiplication operation on the weight matrix and the input feature matrix. The neural network processor 300 may generate an output feature map by rearranging values included in the output feature matrix. An embodiment of configurations of the weight matrix and the input feature matrix will be described in detail with reference to FIG. 9.

The neural network processor 300 according to an example embodiment may perform the Walsh-Hadamard transform on the weight vector obtained from the weight matrix in the dyadic matrix and an input feature vector obtained from the input feature map in order to reduce complexity of the operation and/or amount processing power of the operation. In an embodiment, the weight vector may represent a representative row among a plurality of rows included in the weight matrix. For example, the weight vector may correspond to a first row of the weight matrix. For example, the weight vector may represent a representative column among a plurality of columns included in the weight matrix. In the Walsh-Hadamard transform, a vector or a matrix is transformed by using only coefficients of +1, −1, or 0. The Walsh-Hadamard transform may be referred to as the Hadamard transform or the block-Hadamard transform. In an implementation, the Walsh-Hadamard transform may include the fast Walsh-Hadamard transform. In an implementation, the Walsh-Hadamard transform may include the discrete Walsh-Hadamard transform.

The neural network processor 300 may perform element-wise multiplication (EWM) on the weight vector transformed using the Walsh-Hadamard transform and the input feature vector transformed using on the Walsh-Hadamard transform. The neural network processor 300 may generate an output feature vector by performing the inverse Walsh-Hadamard transform on a resultant vector obtained by performing the EWM. In an implementation, the inverse Walsh-Hadamard transform may include the fast inverse Walsh-Hadamard transform. In an implementation, the inverse Walsh-Hadamard transform may include the discrete inverse Walsh-Hadamard transform. An operation method using the Walsh-Hadamard transform will be described in detail with reference to the following drawings.

In the data processing system 10 according to an example embodiment, the neural network processor 300 performs the operation based on the weight matrix in the dyadic matrix. Accordingly, the amount of the operation and/or the complexity of the operation may be reduced. In detail, since the neural network processor 300 may obtain the output feature vector by transforming the weight matrix and the input feature matrix through the Walsh-Hadamard transform including only the coefficients of +1, −1, or 0, operations for a complex number may be reduced or removed. Therefore, calculation complexity and operation amount of the neural network processor 300 may be reduced. In addition, since the complex number is not used for the Walsh-Hadamard transform, an area occupied by a transform circuit that performs the Walsh-Hadamard transform on a chip may be reduced in comparison with a transform circuit that performs a transformation using the complex number. Furthermore, as the area of the transform circuit is reduced, an area of an arithmetic circuit, e.g., a multiplication and accumulation circuit (MAC) array may be increased on the chip, which may increase operation speed.

FIG. 3 illustrates an expression of a neural network processor based on weight in a block-circulant matrix. A common neural network processor may obtain the output feature vector y by performing the matrix multiplication operation on the weight matrix in the block-circulant matrix and the input feature vector x as illustrated in FIG. 3.

Here, in the weight matrix in the block-circulant matrix is generated by sequentially shifting elements in a preceding row by '1'. For example, a second row may have elements shifted from the first row by '1', a third row may have elements shifted from the second row by '1', and so forth. To express this mathematically, when an element corresponding to an ith row and jth column of the weight matrix is referred to as W_ij, W_ij may be represented by the following EQUATION 1.

$$W\_ij = h((j-i)\%B) \ (B \text{ is a block size}) \quad [\text{EQUATION 1}]$$

The operation illustrated in FIG. 3 may be simplified through the Fourier transform. For convenience sake, the first row of the weight matrix is referred to as a weight vector w. In detail, the neural network processor may obtain the output feature vector y by performing the EWM on the weight vector w transformed based on the Fourier transform and the input feature vector x transformed based on the Fourier transform and performing the inverse Fourier transform on the resultant vector. In this case, since the matrix multiplication operation is replaced by the EWM, an entire amount of the operation is reduced.

However, in the Fourier transform and the inverse Fourier transform, since an operation of multiplying the complex number is required, a significantly large area of a transform circuit for supporting the Fourier transform and the inverse Fourier transform is required. In addition, since the weight vector w transformed based on the Fourier transform and the input feature vector x transformed based on the Fourier transform may have complex number values, significant overhead is caused during the EWM.

In order to solve the problem of the Fourier transform and the inverse Fourier transform while maintaining an advantage generated by replacing the matrix multiplication operation by the EWM, an operation method illustrated in FIG. 4 is suggested as an example embodiment.

FIG. 4 illustrates an expression of a neural network processor according to an example embodiment. The neural network processor according to an example embodiment may obtain the output feature vector y by performing the matrix multiplication operation on the weight matrix in the dyadic matrix and the input feature vector x as illustrated in FIG. 4.

Here, the dyadic matrix is generated by using a characteristic of a binary number. When an element corresponding to an ith row and jth column of the dyadic matrix is referred to as W_ij, W_ij may be represented by the following EQUATION 2.

$$W\_ij = h((i-1) \oplus (j-1)) \ (\oplus \text{ means an XOR operation}) \quad [\text{EQUATION 2}]$$

The operation illustrated in FIG. 4 may be simplified through the Walsh-Hadamard transform. For convenience sake, the first row of the weight matrix is referred to as the weight vector w. In detail, the neural network processor may obtain the output feature vector y by performing the EWM on the weight vector w transformed based on the Walsh-Hadamard transform and the input feature vector x transformed based on the Walsh-Hadamard transform and performing the inverse Walsh-Hadamard transform on the resultant vector of the EWM. In this case, since the matrix multiplication operation is replaced by the EWM, the entire amount of the operation is reduced.

In addition, since only the coefficient of +1, −1, or 0 is used for the Walsh-Hadamard transform and the inverse Walsh-Hadamard transform, in comparison with the Fourier transform and the inverse Fourier transform illustrated in FIG. 3, the calculation complexity and calculation amount may be reduced. In addition, since the weight vector w transformed based on the Walsh-Hadamard transform and the input feature vector x transformed based on the Walsh-Hadamard transform are real number values, the calculation amount of the EWM may be reduced in comparison with the operation illustrated in FIG. 3.

Figure 5:
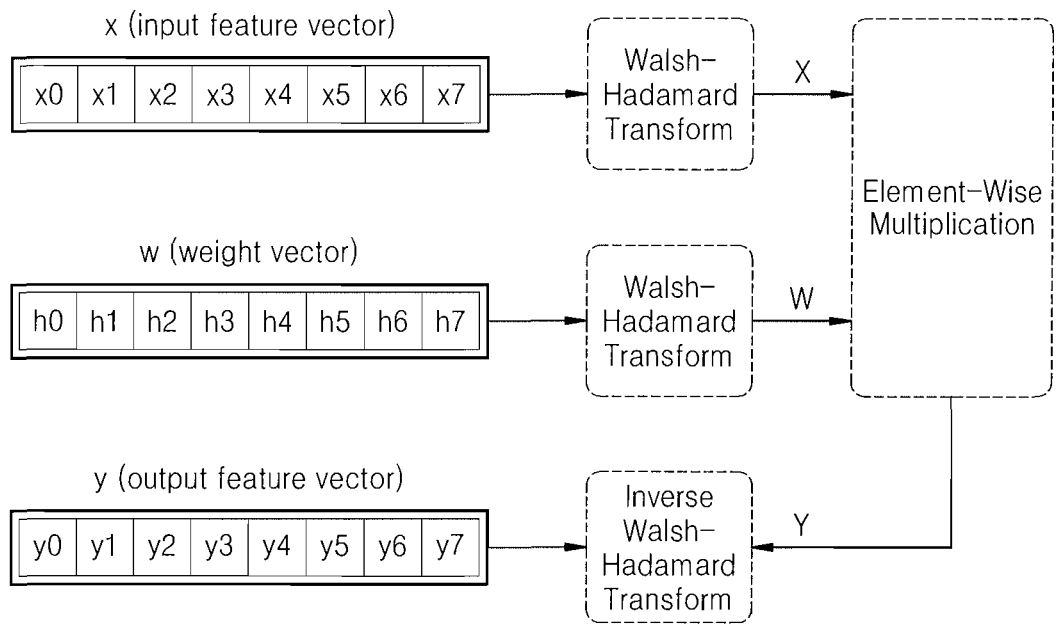
FIG. 5 illustrates an operation process of a neural network processor based on the Walsh-Hadamard transform according to an example embodiment.

FIG. 5 illustrates an operation process of a neural network processor based on the Walsh-Hadamard transform according to an example embodiment. In particular, the operation process of FIG. 5 may represent an operation process of obtaining the output feature vector y by using the weight matrix trained in the dyadic matrix as illustrated in FIG. 4.

The neural network processor may generate the input feature vector x transformed by performing the Walsh-Hadamard transform on the input feature vector x. In addition, the neural network processor may generate the weight vector W transformed by performing the Walsh-Hadamard transform on the weight vector w. The neural network processor may generate the resultant vector Y by performing the EWM on the transformed input feature vector X and the transformed weight vector W.

The neural network processor may generate the output feature vector y by performing the inverse Walsh-Hadamard transform on the resultant vector Y. In an embodiment, the inverse Walsh-Hadamard transform may be performed through an operation of performing the Walsh-Hadamard transform and dividing a resultant value on a block size (for example, '8' in FIG. 5).

Figure 6:
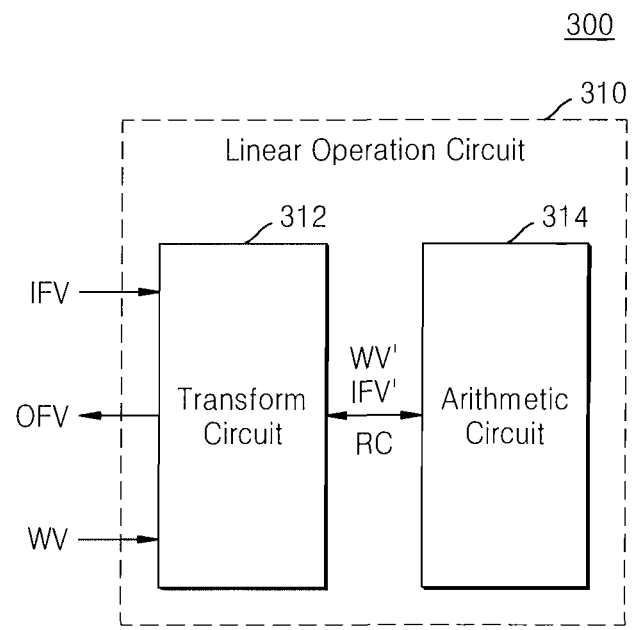
FIG. 6 illustrates a neural network processor according to an example embodiment.

FIG. 6 illustrates the neural network processor 300 according to an example embodiment. The neural network processor 300 of FIG. 6 may correspond to the neural network processor 300 of FIG. 1. Description of the neural network processor 300, which is previously given with reference to FIG. 1, is omitted.

The neural network processor 300 may include a linear arithmetic circuit 310. The linear arithmetic circuit 310 may include a transform circuit 312 and an arithmetic circuit 314.

The transform circuit 312 may transform an input feature vector IFV and a weight vector WV. The input feature vector IFV may be obtained from the input feature map and the weight vector WV may be obtained from the weight matrix. In an embodiment, the weight vector may correspond to the first row of the weight matrix trained in the dyadic matrix. Here, the coefficients of +1, −1, and 0 may be used for the transform. In an embodiment, the transform may include the Walsh-Hadamard transform, e.g., the fast Walsh-Hadamard transform, described with reference to FIG. 5. The transform circuit 312 may provide the transformed input feature vector IFV' and the transformed weight vector WV' to the arithmetic circuit 314.

The arithmetic circuit 314 may perform the EWM on the transformed input feature vector IFV' and the transformed weight vector WV'. For this purpose, the arithmetic circuit 314 may include the MAC array. The arithmetic circuit 314 may generate a resultant vector RV by multiplying corresponding elements of the transformed input feature vector IFV' and the transformed weight vector WV'. The arithmetic circuit 314 may provide the resultant vector RV obtained by performing the EWM to the transform circuit 312. In an embodiment, the arithmetic circuit 314 may include a plurality of operation elements or processing elements.

The transform circuit 312 may generate an output feature vector OFV by performing the inverse Walsh-Hadamard transform on the resultant vector RV provided by the arithmetic circuit 314. The inverse Walsh-Hadamard transform may be performed by performing transform by using the coefficients of +1, −1, and 0 and dividing the resultant value RV on the block size. Here, the inverse Walsh-Hadamard transform may include the fast inverse Walsh-Hadamard transform.

Since coefficients are real numbers in the Walsh-Hadamard transform and the inverse Walsh-Hadamard transform performed by the transform circuit 312, in contrast to complex numbers used in the Fourier transform and the inverse Fourier transform, a relatively small amount computational power is needed. Therefore, when the transform circuit 312 is implemented on the chip, an area smaller than that of the transform circuit using the Fourier transform may be allotted. Therefore, the area of the arithmetic circuit 314 may increase by reducing the area of the transform circuit 312. Accordingly, an entire operation speed of the neural network processor 300 may increase.

Figure 7:
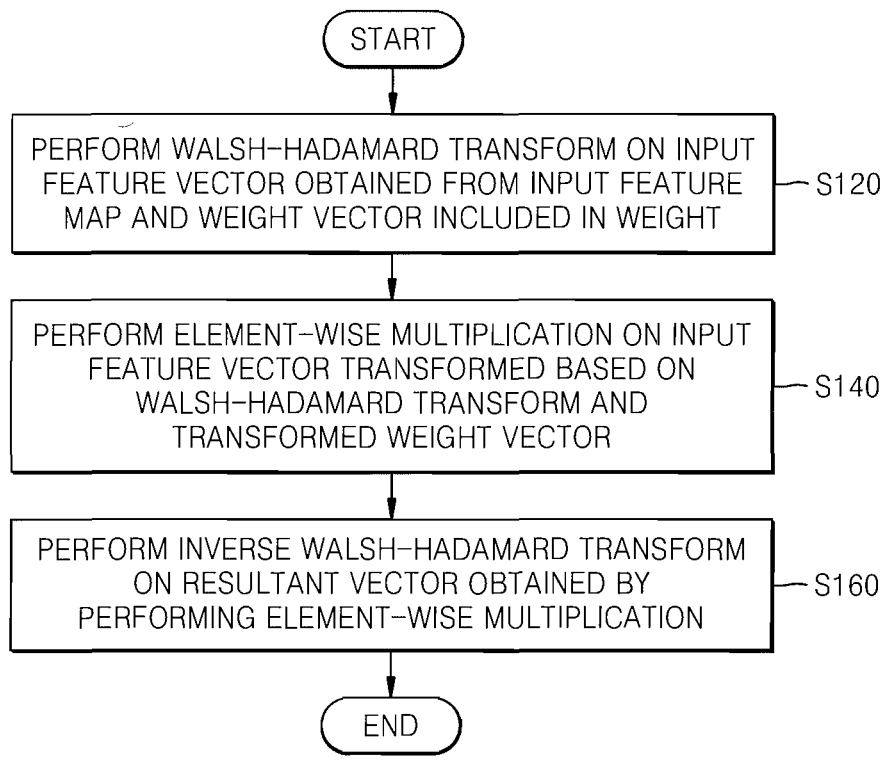
FIG. 7 illustrates a flowchart of an operating method of a neural network processor according to an example embodiment.

FIG. 7 is a flowchart illustrating a method of operating a neural network processor according to an example embodiment. FIG. 7 will be described with reference to FIG. 6.

The neural network processor 300 may perform the Walsh-Hadamard transform on the input feature vector IFV obtained from the input feature map and the weight vector WV included in the weight matrix in operation S120. For example, the transform circuit 312 may perform the Walsh-Hadamard transform on the input feature vector IFV and the weight vector WV. The transform circuit 312 may provide the transformed input feature vector IFVn and the transformed weight vector WVa to the arithmetic circuit 314.

The neural network processor 300 may perform the EWM using the transformed input feature vector IFVn and the transformed weight vector in operation S140. For example, the arithmetic circuit 314 may perform the EWM using the transformed input feature vector IFVt and the transformed weight vector WV. The arithmetic circuit 314 may provide the resultant vector RV obtained by performing the EWM to the transform circuit 312.

The neural network processor 300 may perform the inverse Walsh-Hadamard transform on the resultant vector RV. For example, the transform circuit 312 may generate the output feature vector OFV by performing the inverse Walsh-Hadamard transform on the resultant vector RV.

Figure 8:
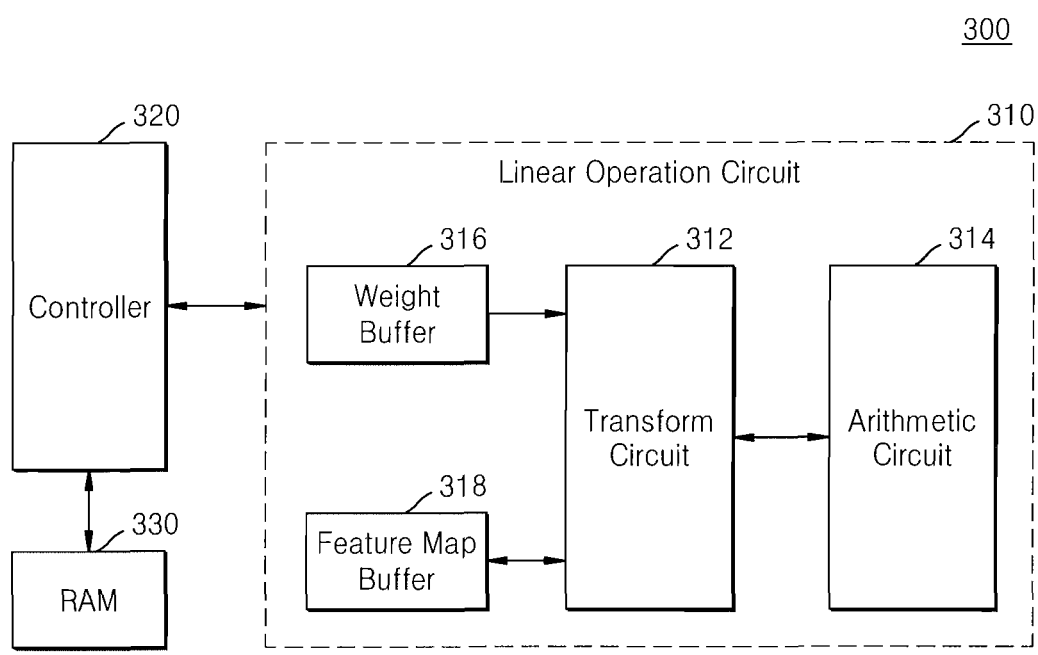
FIG. 8 illustrates a neural network processor according to an example embodiment.

FIG. 8 illustrates the neural network processor 300 according to an example embodiment. The neural network processor 300 of FIG. 8 may correspond to the neural network processor 300 of FIG. 1 and the neural network processor 300 of FIG. 6. Description of the neural network processor 300 of FIG. 8, provided above with reference to FIGS. 1 and 6, is not repeated.

The neural network processor 300 may include a linear arithmetic circuit 310, a controller 320, and a RAM 330. The linear arithmetic circuit 310 may include the transform circuit 312, the arithmetic circuit 314, a weight buffer 316, and a feature map buffer 318. Elements of the neural network processor 300, e.g., the transform circuit 312, the arithmetic circuit 314, the weight buffer 316, the feature map buffer 318, the controller 320, and the RAM 330 may communicate with each other through a system bus. In implementations, the neural network processor 300 may be implemented by one semiconductor chip, e.g., the SoC, by a plurality of semiconductor chips, and the like.

The linear arithmetic circuit 310 may perform various neural network operations that form the output feature map by using the input feature map and the weight.

The controller 320 may control an entire operation of the neural network processor 300. For example, the controller 320 may control operations of the transform circuit 312, the arithmetic circuit 314, the weight buffer 316, and the feature map buffer 318.

The controller 320 may perform preprocessing on the weight and the input feature map. For example, the controller 320 may control the weight buffer 316 so that the weight buffer 316 stores the first row as the weight vector by extracting the first row from the weight or the weight matrix. The weight buffer 316 may provide the stored weight vector to the transform circuit 312. In addition, the controller 320 may generate the input feature matrix by rearranging input feature values included in the input feature map, extract the input feature vector from the input feature matrix, and control the feature map buffer 318 so that the feature map buffer 318 stores the extracted input feature vector. The feature map buffer 318 may provide the stored input feature vector to the transform circuit 312.

The weight buffer 316 may store the weight matrix and the feature map buffer 318 may store the input feature map. The controller 320 may extract the weight vector from the weight matrix stored in the weight buffer 316 and may provide the extracted weight vector to the transform circuit 312. In addition, the controller 320 may extract the input feature vector from the input feature map stored in the feature map buffer 318 and may provide the extracted input feature vector to the transform circuit 312.

In an implementation, the controller 320 may be implemented by hardware, software (or firmware), or a combination of the hardware and the software. In an embodiment, the controller 320 may be implemented by hardware logic designed to perform the above-described functions. In an embodiment, the controller 320 may be implemented by at least one processor, e.g., a central processing unit (CPU), a microprocessor, and the like, and may execute a program including instructions that perform the above-described functions loaded on the RAM 330.

The RAM 330 may be implemented by dynamic RAM (DRAM), static RAM (SRAM), or the like, may store various programs and data for the controller 320, and may store data generated by the controller 320.

The weight buffer 316 may store the weight matrix or the weight vector. The weight buffer 316 may be implemented by a RAM, e.g., the DRAM, the SRAM, and the like.

The feature map buffer 318 may store the input feature map, the input feature matrix, or the input feature vector. The feature map buffer 318 may be also implemented by a RAM, e.g., the DRAM, the SRAM, and the like. In an embodiment, the feature map buffer 318 may be based on general matrix multiplication (GEMM).

The transform circuit 312 may perform the Walsh-Hadamard transform and the inverse Walsh-Hadamard transform as described above. In an implementation, the transform circuit 312 may perform a Winograd transform and an inverse Winograd transform. That is, the transform circuit 312 may support both the Walsh-Hadamard transform and the Winograd transform. The Winograd transform only uses coefficients of '1', '0', or '−1', so provides similar computational efficiency as the Walsh-Hadamard transform.

The arithmetic circuit 314 may perform the EWM on the transformed input feature vector IFVn and the transformed weight vector WV output by the transform circuit 312.

Figure 9:
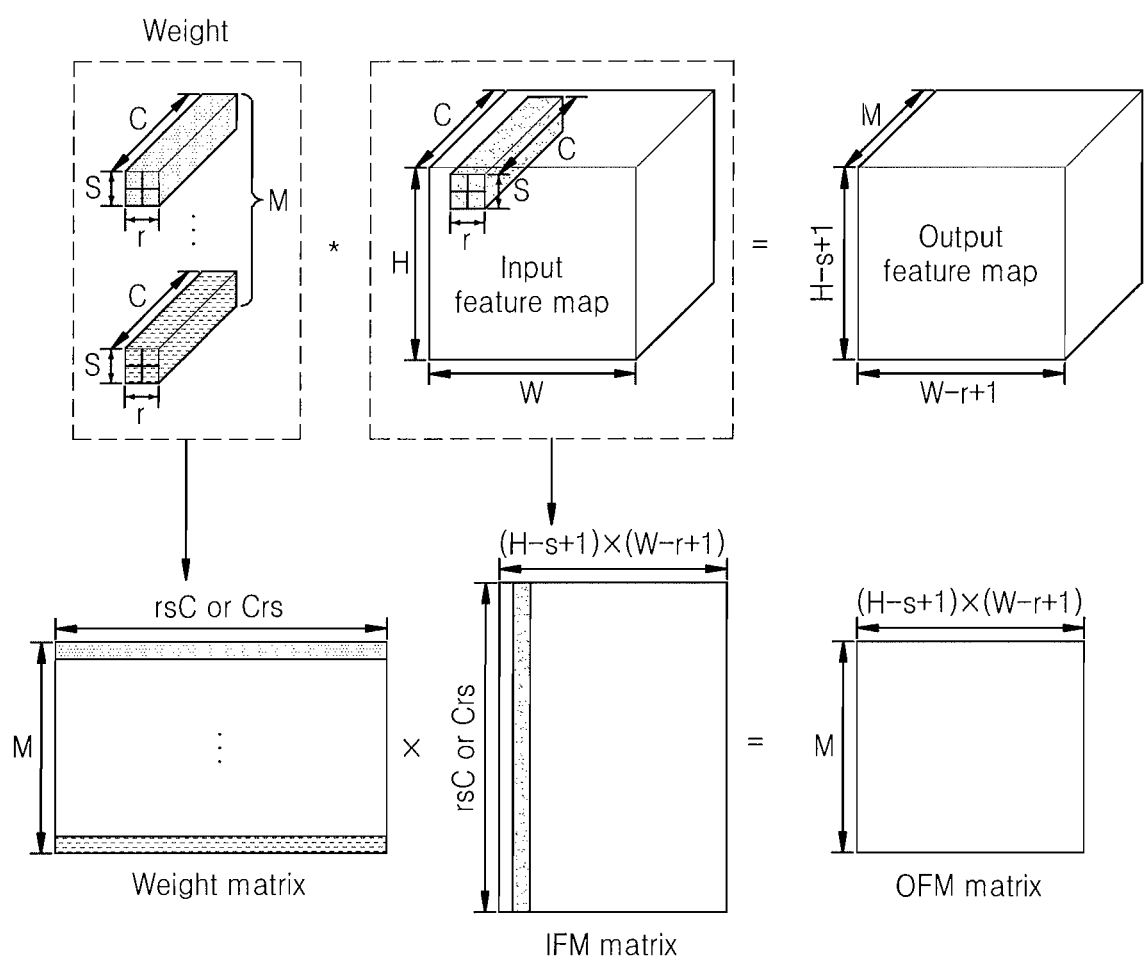
FIG. 9 illustrates a process of generating a weight matrix and an input feature matrix according to an example embodiment.

FIG. 9 illustrates a process of generating a weight matrix and an input feature matrix according to an example embodiment. In particular, FIG. 9 illustrates a transform process of replacing the convolution operation between the weight and the input feature map by the matrix multiplication operation between the weight matrix and the input feature matrix. FIG. 9 is described with reference to FIG. 8.

The neural network processor 300 may generate a weight matrix with M rows by using M weights by configuring weight values included in each of a plurality of weights by one row in order to replace the convolution operation by the matrix multiplication operation. In an embodiment, the controller 320 may generate the weight matrix.

Each of the plurality of weights may have a width of 'r' and a height of 's'. As a non-restrictive example, the width of each of the plurality of weights may be '3' and the height thereof may be '3'. That is, in the non-restrictive example, each of the plurality of weights may include a 3×3 matrix. However, an example of a size of the weight may vary in accordance with an embodiment.

The neural network processor 300 may generate an input feature map matrix by configuring input feature values by an amount obtained by multiplying the number of channels by a window size of the weight by one column for an input feature map with the number of channels by 'C'. As a result, when the window height of the weight is represented as 's', the window width of the weight is represented as 'r', a height of an original input feature map is represented as 'H', and a width of the original input feature map is represented as 'W', the number of columns of the input feature matrix may be (H−s+1)(W−r+1). In an embodiment, the controller 320 may generate the input feature matrix from the input feature map. By generating such a matrix, the convolution operation at an upper end may be replaced by the matrix multiplication operation.

The NN according to an example embodiment may be trained so that such a weight matrix is in a dyadic matrix. In addition, the NN may generate an output feature map matrix by dividing the input feature map matrix into a plurality of input feature vectors and performing matrix multiplication between the weight matrix and the input feature vectors a plurality of times. In addition, the matrix multiplication between the weight matrix and the input feature vectors may be replaced by the Walsh-Hadamard transform and the EWM as described above that the operation amount may be reduced.

FIG. 10 illustrates expressions of a weight matrix W_Mat and an input feature matrix IFM_Mat according to an example embodiment. In particular, FIG. 10 illustrates a method of supporting transform for a weight matrix of a second block size greater than a first block size by using the Walsh-Hadamard transform corresponding to the first block size. FIG. 10 is described with reference to FIG. 8.

The output feature matrix OFM_Mat may be obtained through the matrix multiplication between the weight matrix W_Mat and the input feature matrix IFM_Mat. When the transform circuit 312 supports the Walsh-Hadamard transform for the first block size and the weight matrix W_Mat has the second block size greater than the first block size, the controller 320 may divide the weight matrix W_Mat into a plurality of weight sub-matrixes W11, W1q, Wij, Wp1, and Wpq. For example, the controller 320 may divide the weight matrix W_Mat of the second block size into the plurality of weight sub-matrixes of the first block size. In addition, the controller 320 may divide the input feature matrix IFM_Mat into a plurality of input feature vectors Xj. In this case, an ith vector a_i of the output feature matrix OFM_Mat may be obtained through the following EQUATION 3.

$$a_i = \Sigma_{j=i}^{q} \text{IWHT}(\text{WHT}(W_{ij}) * \text{WHT}(X_j)) \quad \text{[EQUATION 3]}$$

Here, an operation on Wij and Xj may be performed through the operation method described through the operation described with reference to FIGS. 4 to 8.

As described above, the neural network processor 300 may support an operation for the weight matrix of a greater block size. In particular, when the Walsh-Hadamard transform corresponding to the first block size is used, the operation may be supported for the weight matrix of a size corresponding to natural number times the first block size. In this case, in order for the operation to be supported, when the weight matrix is divided into the plurality of weight sub-matrixes, each of the plurality of weight sub-matrixes is to be also in the dyadic matrix, which will be described with reference to FIG. 11.

FIG. 11 illustrates the weight matrix W_Mat according to an example embodiment. In particular, FIG. 11 illustrates a method of supporting the Walsh-Hadamard transform for the weight matrix of a block size '8' by using the Walsh-Hadamard transform corresponding to a block size '4' as an example. The block size '4' or '8' is only example for convenience sake. FIG. 11 is described with reference to FIG. 8.

The neural network processor 300 may divide the weight matrix W_Mat in the dyadic matrix into a plurality of weight sub-matrixes W11, W12, W21, and W22. Each of the weight sub-matrixes W11, W12, W21, and W22 is in the dyadic matrix. Therefore, the neural network processor 300 may support transform and operation of a greater block size by dividing the weight matrix W_Mat into the plurality of weight sub-matrixes as illustrated in FIG. 10.

Figure 12:
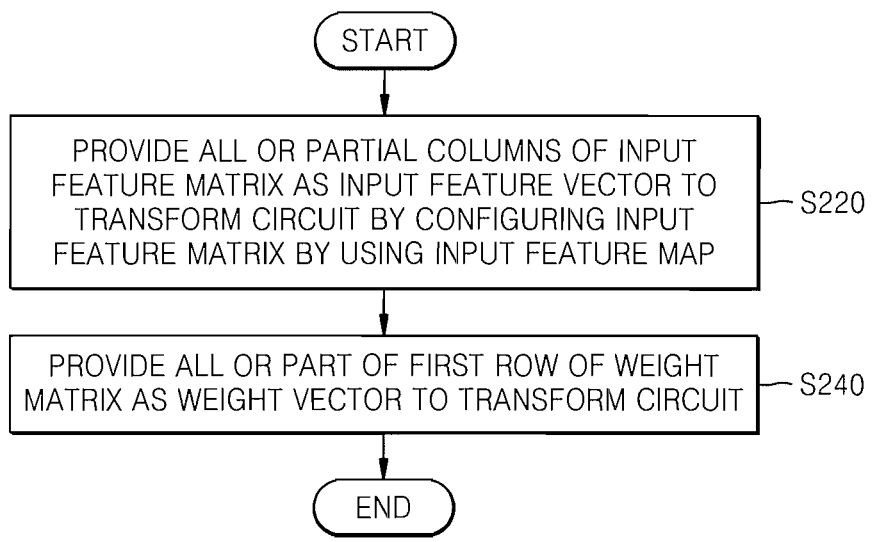
FIG. 12 illustrates a flowchart of a method of operating the neural network processor according to an example embodiment.

FIG. 12 illustrates a flowchart of a method of operating the neural network processor 300 according to an example embodiment. FIG. 12 is described with reference to FIG. 8.

The neural network processor 300 may provide all or partial columns of the input feature matrix as the input feature vector to the transform circuit 312 by configuring the input feature matrix by using the input feature map in operation S220. In an embodiment, when the input feature matrix corresponds to a vector of a block size supported by the Walsh-Hadamard transform, the neural network processor 300 may provide the entire input feature matrix as the input feature vector to the transform circuit 312. In addition, when the input feature matrix has a greater size than the vector of the above block size, the neural network processor 300 may provide the partial columns of the input feature matrix as the input feature vector to the transform circuit 312.

The neural network processor 300 may provide all or a part of the first row of the weight matrix as the weight vector to the transform circuit 312 in operation S240. In an embodiment, when the size of the weight matrix is the same as the block size supported by the Walsh-Hadamard transform, the neural network processor 300 may provide the first row of the weight matrix as the weight vector to the transform circuit 312. In addition, when the size of the weight matrix is greater than the block size supported by the Walsh-Hadamard transform, the first row of the weight sub-matrix that is a part of the weight matrix as the weight vector may be provided to the transform circuit 312.

Figure 13A:
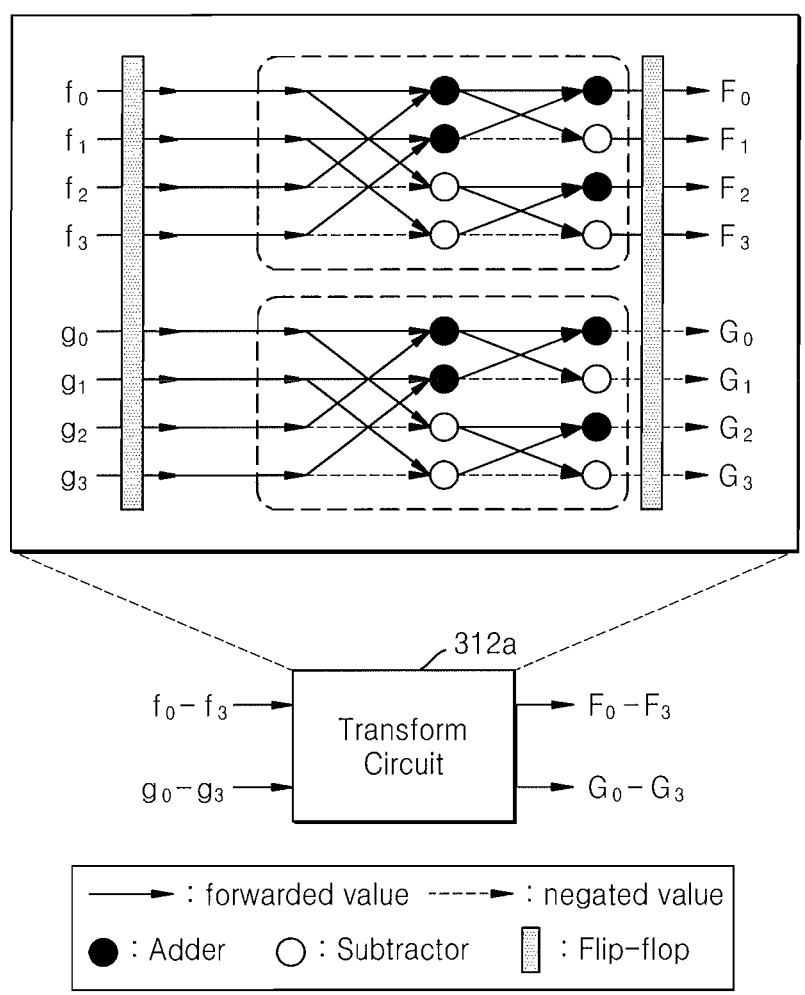
FIGS. 13A and 13B illustrate transform circuits according to an example embodiment.
Figure 13B:
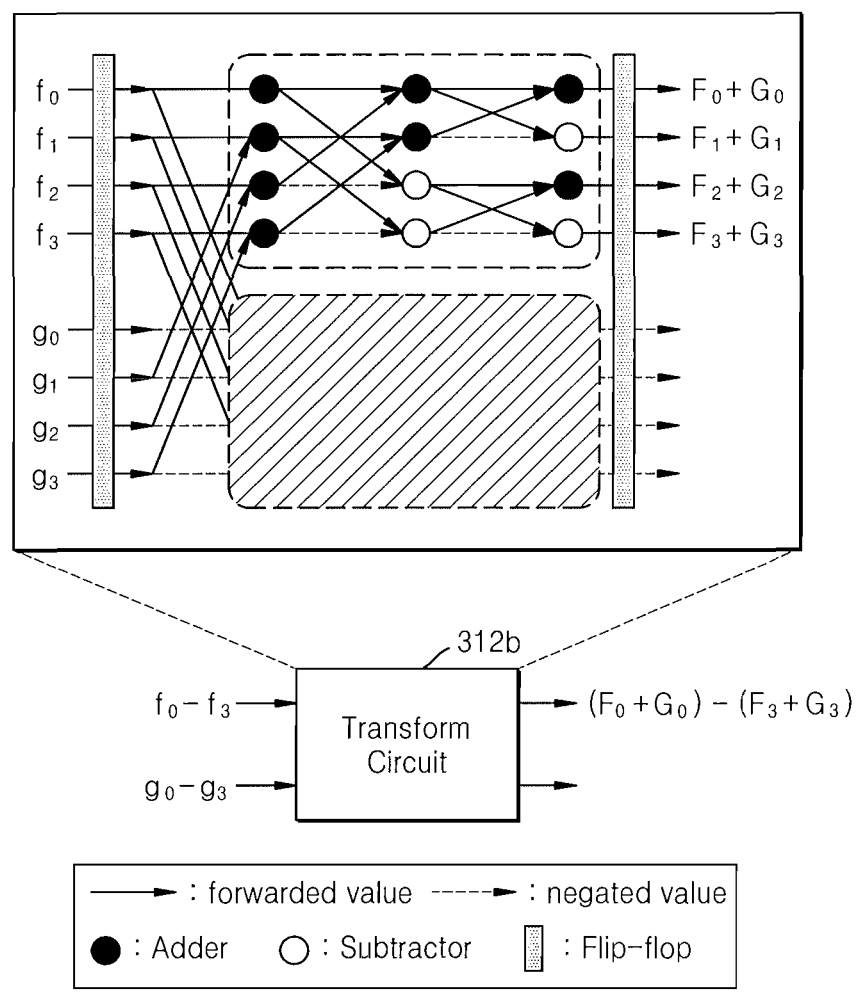

FIGS. 13A and 13B illustrate transform circuits 312a and 312b according to an example embodiment. Referring to FIGS. 13A and 13B, the transform circuits 312a and 312b that provide the Walsh-Hadamard transform corresponding to the first block size may provide the transform to the weight matrix corresponding to the second block size less than the first block size. In particular, FIG. 13A illustrates an embodiment corresponding to setup (a) in supporting a less block size and FIG. 13B illustrates an embodiment corresponding to setup (b) in supporting a less block size. In FIGS. 13A and 13B, for convenience sake, it is illustrated that the transform circuits 312a and 312b that support a transform function for the block size '8' are applied to the weight matrix of the block size '4'. However, the block size '8' or '4' is only for convenience sake.

Referring to FIG. 13A, the transform circuit 312a may include hardware and/or software resources for supporting the block size '8'. For example, in order to support the Walsh-Hadamard transform, the transform circuit 312a may include a flip-flop, an adder, and a subtractor and may have a butterfly structure in which output values $F_0$-$F_3$ and $G_0$-$G_3$ are generated through addition or subtraction in various stages based on input values $f_0$-$f_3$ and $g_0$-$g_3$. In order to support the block size '4' less than '8', the transform circuit 312a may dividedly use resources included therein. For example, the transform circuit 312a may generate the output values $F_0$-$F_3$ from the input values $f_0$-$f_3$ by using four upper butterfly structures and may generate the output values $G_0$-$G_3$ from the input values $g_0$-$g_3$ by using four lower butterfly structures.

Referring to FIG. 13B, the transform circuit 312b may include hardware and/or software resources for supporting the block size '8'. In order to support the block size '4' less than '8', the transform circuit 312b may generate output values $(F_0+G_0)$-$(F_3+G_3)$ from input values $f_0$-$f_3$ and $g_0$-$g_3$ by using only some of the resources included therein.

As described above, the transform circuits 312a and 312b may perform the Walsh-Hadamard transform on the weight matrix of a block size less than the originally supported block size.

Figure 14A:
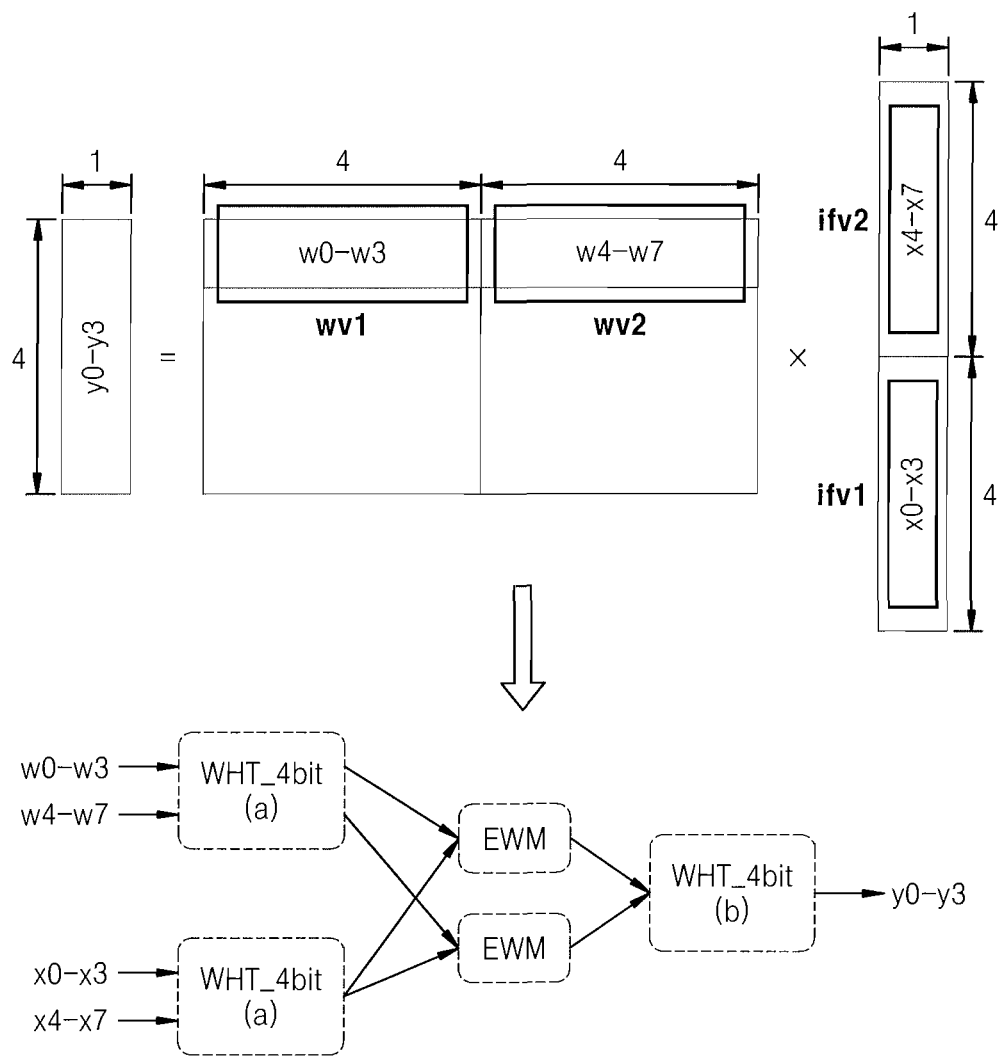

FIGS. 14A and 14B illustrate an operation method of a neural network processor according to an example embodiment. FIG. 14A illustrates a case in which weight matrixes each having a block size '4' are horizontally combined with each other. FIG. 14B illustrates a case in which weight matrixes each having a block size '4' are vertically combined with each other. For convenience, it is assumed that the transform circuit supports the Walsh-Hadamard transform corresponding to a block size '8'.

Referring to FIG. 14A, in order to obtain output feature values y0-y3, the neural network processor may perform operations by using a first weight vector wv1, a second weight vector wv2, a first input feature vector ifv1, and a second input feature vector ifv2.

The neural network processor may perform the Walsh-Hadamard transform on the first weight vector wv1 and the second weight vector wv2 by using the transform circuit in accordance with the setup (a) illustrated in FIG. 13A. Likely, the neural network processor may perform the Walsh-Hadamard transform on the first input feature vector ifv1 and the second input feature vector ifv2 by using the transform circuit in accordance with the setup (a) illustrated in FIG. 13A.

The neural network processor may perform the EWM on the transformed first weight vector and the transformed first input feature vector and may perform the EWM on the transformed second weight vector and the transformed second input feature vector.

The neural network processor may perform the inverse Walsh-Hadamard transform on the first resultant vector and the second resultant vector obtained by performing the EWM by using the transform circuit in accordance with the setup (b) illustrated in FIG. 13B and may add the resultant vectors obtained by performing the inverse Walsh-Hadamard transform. By an operation of the transform circuit in accordance with the setup (b), the neural network processor may obtain the output feature values y0-y3.

Referring to FIG. 14B, in order to obtain output feature values y0-y3 and y4-y7, the neural network processor may perform operations by using the first weight vector wv1, the second weight vector wv2, and the first input feature vector ifv1.

The neural network processor may perform the Walsh-Hadamard transform on the first weight vector wv1 and the second weight vector wv2 by using the transform circuit in accordance with the setup (a) illustrated in FIG. 13A. Likely, the neural network processor may perform the Walsh-Hadamard transform on the first input feature vector ifv1 by using the transform circuit in accordance with the setup (a) illustrated in FIG. 13A.

The neural network processor may perform the EWM on the transformed first weight vector and the transformed first input feature vector and may perform the EWM on the transformed second weight vector and the transformed first input feature vector.

The neural network processor may perform the inverse Walsh-Hadamard transform on the first resultant vector and the second resultant vector obtained by performing the EWM by using the transform circuit in accordance with the setup (a) illustrated in FIG. 13A. By an operation of the transform circuit in accordance with the setup (a), the neural network processor may obtain the output feature values y0-y3 and y4-y7.

Figure 15:
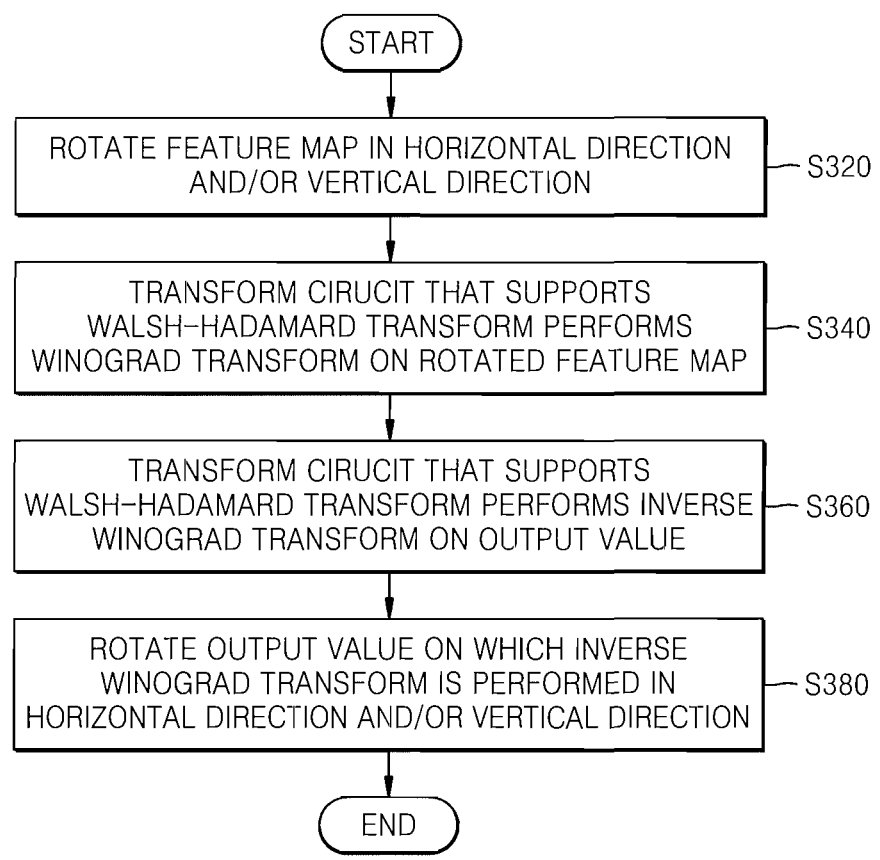
FIG. 15 illustrates an operation method of a neural network processor according to an example embodiment.

FIG. 15 illustrates an operation method of a neural network processor according to an example embodiment. In particular, FIG. 15 illustrates an embodiment in which the neural network processor further supports the Winograd transform on feature maps by using the transform circuit that supports the Walsh-Hadamard transform. FIG. 15 is described with reference to FIG. 8.

The neural network processor 300 may rotate the feature map in a horizontal direction and/or a vertical direction in operation S320. As described above, since the coefficients used for the Walsh-Hadamard transform and the Winograd transform are similar, are the same, or are in an inclusion relation, the transform circuit 312 may be shared. In some cases, when the Winograd transform is directly applied to the feature map by using the transform circuit 312 that supports the Walsh-Hadamard transform, the Winograd transform may not be properly performed. Therefore, the neural network processor 300 or the controller 320 included in the neural network processor 300 may rotate the feature map in the horizontal direction and/or the vertical direction. In an embodiment, the neural network processor 300 may support the Winograd transform and the Walsh-Hadamard transform by a time interleaving method.

The transform circuit 312 that supports the Walsh-Hadamard transform may perform the Winograd transform on the rotated feature map in operation S340.

In addition, the transform circuit 312 that supports the Walsh-Hadamard transform may perform the inverse Winograd transform on a value output from the arithmetic circuit 314 in operation S360.

The neural network processor 300 may generate the output feature map by rotating the output value on which the inverse Winograd transform is performed in the horizontal direction and/or the vertical direction in operation S380.

Figure 16:
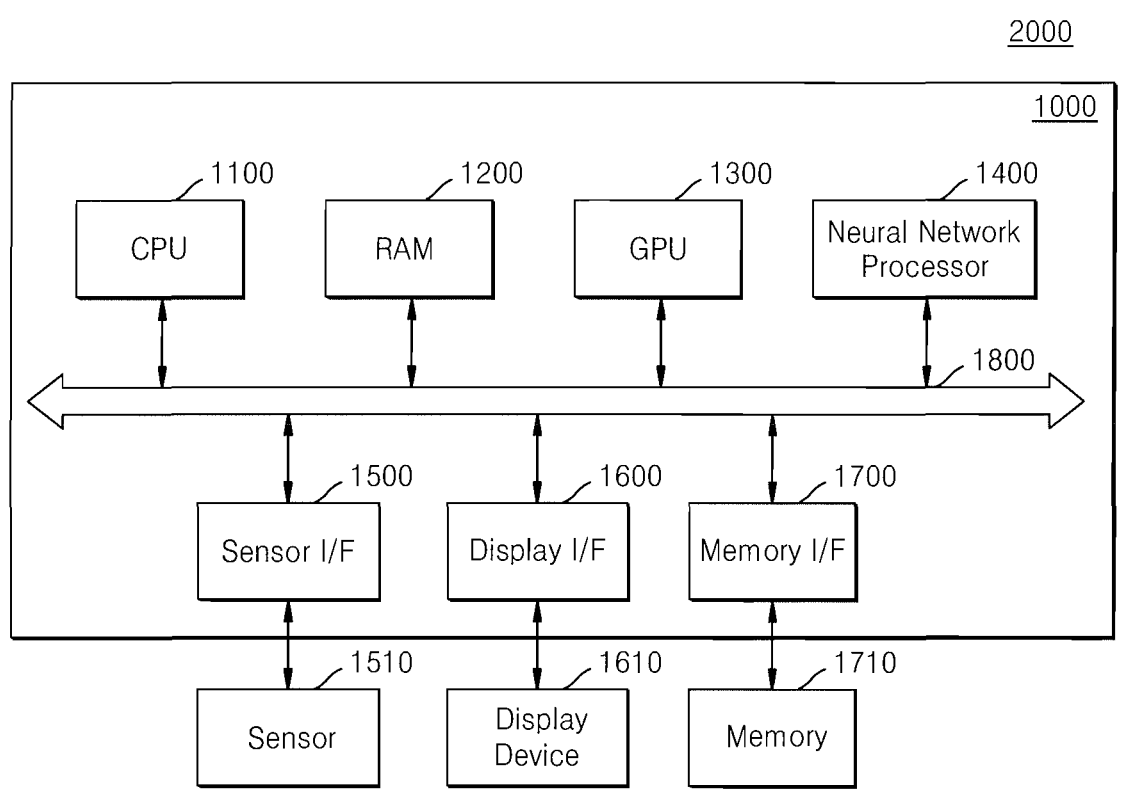
FIG. 16 illustrates an integrated circuit and an apparatus including the same according to an example embodiment.

FIG. 16 illustrates an integrated circuit 1000 and an apparatus 2000 including the same according to an example embodiment. Referring to FIG. 16, the apparatus 2000 may include the integrated circuit 1000 and elements connected to the integrated circuit 1000, for example, a sensor 1510, a display device 1610, and memory 1710. The apparatus 2000 may process data based on the NN.

The integrated circuit 1000 according to an example embodiment may include a central processing unit (CPU) 1100, RAM 1200, a graphics processing unit (GPU) 1300, a neural network processor 1400, a sensor interface 1500, a display interface 1600, and a memory interface 1700. The integrated circuit 1000 may further include other universal elements, e.g., a communication module, a digital signal processor (DSP), a video module, and the like. The elements of the integrated circuit 1000 (the CPU 1100, the RAM 1200, the GPU 1300, the neural network processor 1400, the sensor interface 1500, the display interface 1600, and the memory interface 1700) may transmit and receive data through a bus 1800. In an embodiment, the integrated circuit 1000 may be an application processor (AP). In an embodiment, the integrated circuit 1000 may be implemented by the SoC.

The CPU 1100 may control an entire operation of the integrated circuit 1000. The CPU 1100 may include a single processor core or a plurality of processor cores. The CPU 1100 may process or execute programs and/or data stored in the memory 1710. In an embodiment, the CPU 1100 may control a function of the neural network processor 1400 by executing the programs stored in the memory 1710.

The RAM 1200 may temporarily store programs, data, and/or instructions. In an embodiment, the RAM 1200 may be implemented by a DRAM, an SRAM, or the like. The RAM 1200 may temporarily store data input and output through the interfaces 1500 and 1600 or generated by the GPU 1300 or the CPU 1100, for example, image data.

In an embodiment, the integrated circuit 1000 may further include the ROM. The ROM may store continuously used programs and/or data. The ROM may be implemented by the EPROM or the EEPROM.

The GPU 1300 may perform image processing on image data. For example, the GPU 1300 may perform image processing on image data received through the sensor interface 1500. The image data processed by the GPU 1300 is stored in the memory 1710 or may be provided to the display device 1610 through the display interface 1600. The image data stored in the memory 1710 may be provided to the neural network processor 1400.

The sensor interface 1500 may interface data (e.g., image data or voice data) input from the sensor 1510 connected to the integrated circuit 1000.

The display interface 1600 may interface data (for example, an image) output to the display device 1610. The display device 1610 may output data on an image through a display such as a liquid crystal display (LCD) or an active matrix organic light emitting diode (AMOLED).

The memory interface 1700 may interface data input from the memory 1710 outside the integrated circuit 1000 or data output to the memory 1710. In an embodiment, the memory 1710 may be implemented by a volatile memory, e.g., a DRAM or SRAM, or a non-volatile memory, e.g., resistive RAM (ReRAM), PRAM, NAND flash, and the like. The memory 1710 may be implemented by a memory card, e.g., a multimedia card (MMC), an embedded multimedia card (eMMC), a secure digital (SD) card, a micro-SD card, and the like.

The neural network processor 1400 may perform an operation by performing the Walsh-Hadamard transform based on the weight matrix in the dyadic matrix as described above with reference to FIGS. 1, 2, and 4 to 12.

By way of summation and review, one or more embodiments may provide a method and apparatus for increasing an operation speed by reducing calculation complexity and reducing an area occupied by a transform circuit on a chip in an apparatus for accelerating a neural network (NN) and a method of operating the same.

The various operations of methods described above may be performed by any suitable means capable of performing the operations, such as various hardware and/or software component(s), circuits, and/or module(s).

The software may comprise an ordered listing of executable instructions for implementing logical functions, and can be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A neural network (NN) processor for a NN, the processor comprising:
   an input feature map buffer configured to store an input feature matrix;
   a weight buffer configured to store a weight matrix trained in a form of a dyadic matrix;
   a transform circuit configured to perform a Walsh-Hadamard transform on an input feature vector obtained from the input feature matrix and a weight vector included in the weight matrix and to output a transformed input feature vector and a transformed weight vector; and
   an arithmetic circuit configured to perform an element-wise multiplication (EWM) on the transformed input feature vector and the transformed weight vector.

2. The processor as claimed in claim 1, wherein the transform circuit is further configured to generate an output feature vector by performing an inverse Walsh-Hadamard transform on a vector generated by the EWM of the arithmetic circuit.

3. The processor as claimed in claim 2, wherein the transform circuit is further configured to perform the inverse Walsh-Hadamard transform by performing a division operation on a block size after performing the Walsh-Hadamard transform.

4. The processor as claimed in claim 1, wherein the weight vector corresponds to a representative row among a plurality of rows included in the weight matrix.

5. The processor as claimed in claim 1, further comprising a controller configured to generate the input feature matrix by reconfiguring input feature values included in an input feature map into a matrix.

6. The processor as claimed in claim 1, wherein the transform circuit is further configured to further support a Winograd transform or an inverse Winograd transform performed on the input feature matrix or the weight matrix.

7. The processor as claimed in claim 6, wherein the transform circuit is further configured to support the Walsh-Hadamard transform and the Winograd transform by using a time interleaving method.

8. The processor as claimed in claim 1, wherein the NN includes at least one of a convolutional Neural Network (CNN), a recurrent Neural Network (RNN), and a deep Neural Network (DNN).

9. A method of operating a neural network (NN), the method comprising:
   obtaining a weight matrix in a form of a dyadic matrix by training the NN under a dyadic constraint for forming the weight matrix in the dyadic matrix; and
   generating an output feature map based on the weight matrix and an input feature map.

10. The method as claimed in claim 9, wherein generating the output feature map includes performing a convolution operation on the weight matrix and the input feature map.

11. The method as claimed in claim 9, wherein generating the output feature map includes:
    configuring the weight matrix using weight values included in a plurality of weights;
    generating an input feature vector by reconfiguring input feature values included in the input feature map as a matrix; and
    generating an output feature vector included in the output feature map by performing a matrix multiplication operation on the weight matrix and the input feature vector.

12. The method as claimed in claim 9, wherein generating the output feature map includes generating an output feature vector included in the output feature map by transforming a weight vector obtained from the weight matrix and an input feature vector obtained from the input feature map by using a coefficient of +1, −1, or 0.

13. The method as claimed in claim 9, wherein generating the output feature map includes:
    performing a Walsh-Hadamard transform on a weight vector obtained from the weight matrix and an input feature vector obtained from the input feature map to generate a transformed weight matrix and a transformed input feature vector;
    performing an element-wise multiplication (EWM) on the transformed weight matrix and the transformed input feature vector to generate a resultant vector; and
    generating an output feature vector included in the output feature map by performing an inverse Walsh-Hadamard transform on the resultant vector obtained by performing the EWM.

14. The method as claimed in claim 9, wherein generating the output feature map includes:
    dividing the weight matrix of a first size into a plurality of weight sub-matrixes of a second size less than the first size;
    performing a Walsh-Hadamard transform corresponding to the second size on a plurality of weight vectors respectively obtained from the plurality of weight sub-matrixes and an input feature vector obtained from the input feature map;
    performing an element-wise multiplication (EWM) on a plurality of weight vectors transformed based on the Walsh-Hadamard transform and an input feature vector transformed based on the Walsh-Hadamard transform; and generating output feature vectors included in the output feature map by performing an inverse Walsh-Hadamard transform on resultant vectors obtained by performing the EWM.

15. The method as claimed in claim 9, wherein generating the output feature map includes:
performing a Walsh-Hadamard transform and an inverse Walsh-Hadamard transform on the weight matrix of a second block size less than a first block size by using a transform circuit that supports the Walsh-Hadamard transform corresponding to the first block size.

16. The method as claimed in claim 9, wherein obtaining the weight matrix and generating the output feature map includes one of a Walsh-Hadamard transform and a Winograd transform on the weight matrix and the input feature map.

17. A method of operating a neural network (NN), the method comprising:
performing a Walsh-Hadamard transform on a weight vector and an input feature vector to generate a transformed weight vector and a transformed input feature vector;
performing an element-wise multiplication (EWM) on the transformed weight vector and the transformed input feature vector to generate a resultant vector; and
generating an output feature vector by performing an inverse Walsh-Hadamard transform on the resultant vector.

18. The method as claimed in claim 17, wherein the weight vector corresponds to a first row of a weight matrix trained in a form of a dyadic matrix.

19. The method as claimed in claim 17, wherein generating the output feature vector includes:
performing the Walsh-Hadamard transform on the resultant vector; and
dividing the resultant vector transformed based on the Walsh-Hadamard transform to have a block size.

20. The method as claimed in claim 17,
wherein the Walsh-Hadamard transform supports a transform corresponding to a first block size, and
wherein performing the Walsh-Hadamard transform includes:
dividing a weight matrix of a second block size greater than the first block size into a plurality of weight sub-matrixes of the first block size; and
performing the Walsh-Hadamard transform on weight vectors corresponding to a first row of each of the plurality of weight sub-matrixes.

* * * * *